May 21, 1968    P. DRAZAN ET AL    3,384,115
PNEUMATIC LOGIC SYSTEM ON THE BLOCK PRINCIPLE
Filed Sept. 27, 1965    3 Sheets-Sheet 1
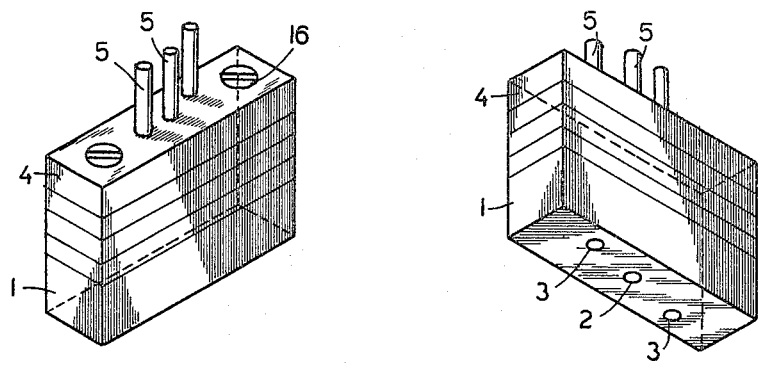
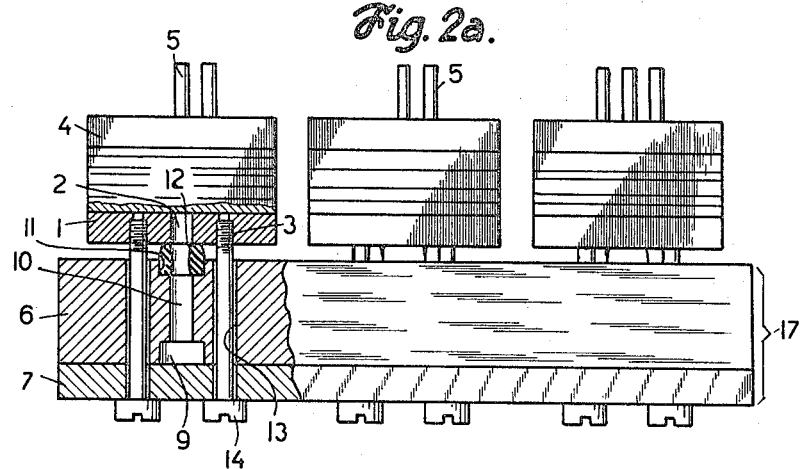
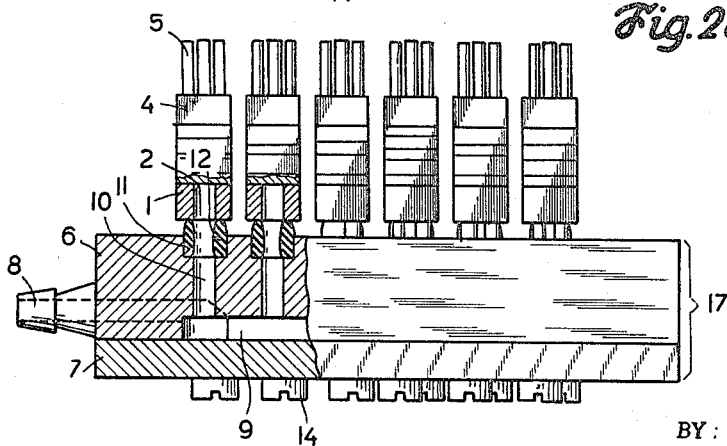
INVENTORS:
Pavel DRAŽAN and
Ondřej BRYCHTA
BY: Arthur O. Klein
their Attorney

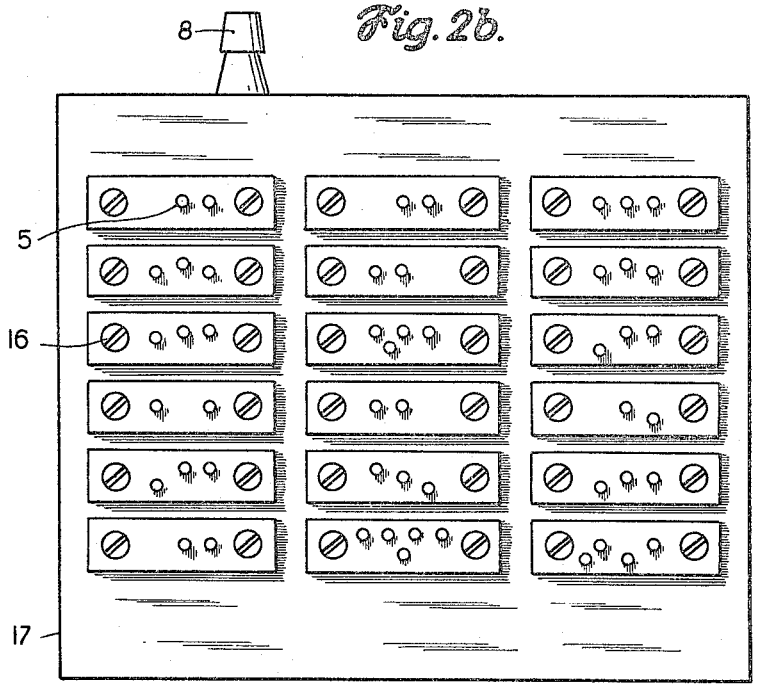
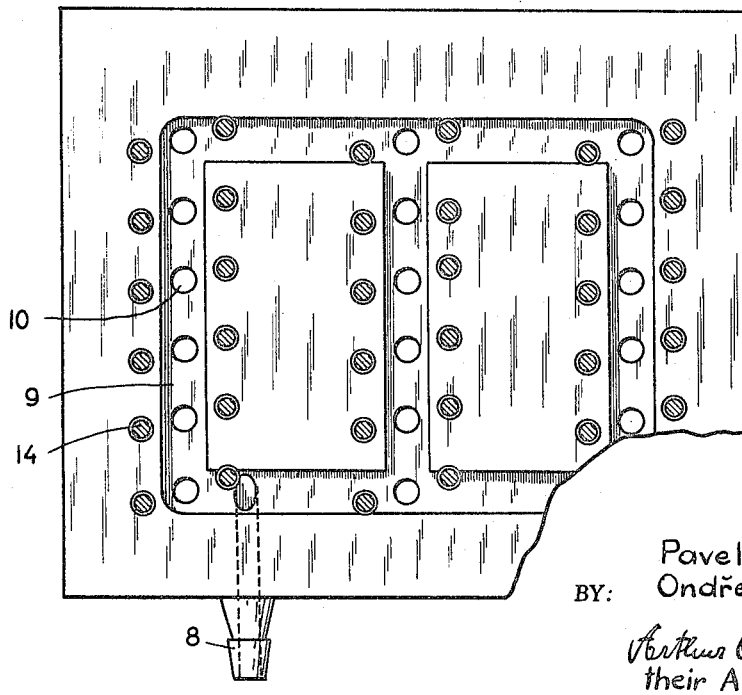

May 21, 1968 P. DRAZAN ET AL 3,384,115
PNEUMATIC LOGIC SYSTEM ON THE BLOCK PRINCIPLE
Filed Sept. 27, 1965 3 Sheets-Sheet 3

INVENTORS:
Paul DRAZAN and
BY: Ondřej BRYCHTA
Arthur O. Klein
their Attorney

United States Patent Office 3,384,115
Patented May 21, 1968

3,384,115
PNEUMATIC LOGIC SYSTEM ON THE BLOCK PRINCIPLE
Pavel Dražan, Prague, and Ondřej Brychta, Trencin, Czechoslovakia, assignors to Zavody prumyslove Automatisace, Narodni podnik, Prague, Czechoslovakia
Filed Sept. 27, 1965, Ser. No. 490,212
Claims priority, application Czechoslovakia, Sept. 29, 1964, 5,400/64
4 Claims. (Cl. 137—608)

ABSTRACT OF THE DISCLOSURE

A pneumatic logic system comprising a feeder block which is formed by a top plate and a base plate between which there are disposed a plurality of bores. The latter being in communication with a network of feeder passages which have outlet openings in the top plate of said feeder block, on the one hand, and with the source of pneumatic power, on the other hand. A plurality of logic elements being selectively and removably connected via said network of feeder passages to the plurality of bores of the feeder block. Each logic element has an inlet opening which is placed in communication with a preselected outlet opening of said network of feeder passages by means of a tube of resilient material which is mounted in said outlet opening. Each of the logic elements is composed of a top plate and a bottom plate of uniform ground plan and dimensions, the top plate being provided with at least one opening. Each logic element has moving parts operatively mounted therein which utilize the pressure of the working medium fed through the feeder block for their operation. The individual logic elements are in operative communication with each other by means of flexible tubes connected to the openings in the top plates thereof.

SPECIFICATION

Figure 3:
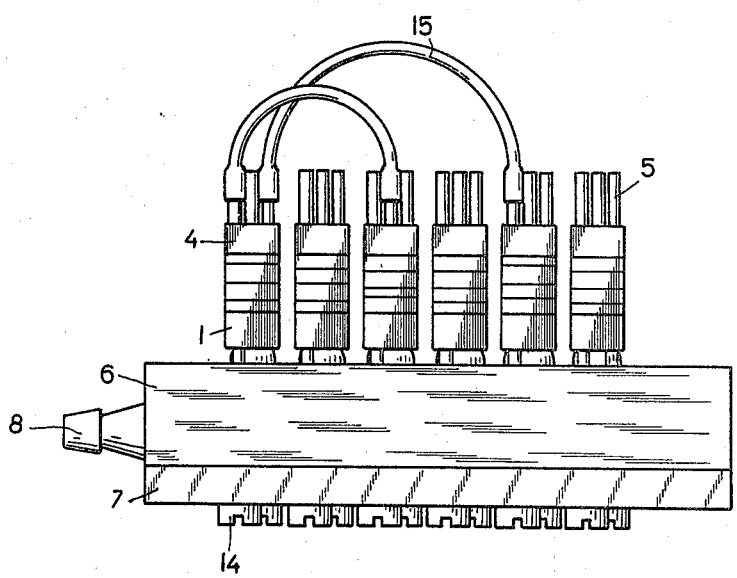

This invention relates to a pneumatic logic system based on the block principle.

One of the objects of the present invention is to solve the problem concerning the method of construction of the signal and feeder conductor networks for pneumatic logical elements which are used for switching the said elements in pneumatic logic circuits.

Hitherto, the conventional solution to the problem of constructing a signal conductor network consisted in the provision of small metal tubes with threaded connections, connector fittings being provided on the individual logical elements. This form of construction does not allow for the miniaturization of the system as a whole, as adjustments in the system are very difficult to make and the construction is expensive and difficult to manufacture.

Progress in the art has led to an ever-increasing complexity in the arrangement of the signal conductor networks, in which the aforementioned form of construction has been found no longer suitable. Further, solutions for conductor networks have been provided, using flat switch panels in which switching grooves or slots are made by milling, pressing or etching. Such solutions are especially suitable in logical elements operated on the so-called flow principle, where it is required that the pressure drop between the individual elements should be rigorously maintained.

In pneumatic logical elements with moving parts which utilize the pressure of the working medium for their operation, the solution embodying flat switching panels with cut switching slots is not economical. In addition, it is necessary to take account of the fact that the individual logical elements passes particular breakdown probabilities, whereby the execution of repairs and in fact the determination of the faults or breakdown causes present extreme difficulties. Moreover, this form of construction always requires a particular combination of the logical elements according to the type of switching circuit design, and the switching panels are different for different, logical switching circuits, all of which leads to a highly specialised and consequently very expensive form of construction.

The aforesaid disadvantages are obviated or mitigated by the present invention. According to the present invention there is provided a pneumatic, logic system comprising a series of individual logical elements, a feeder block means and a signal circuit network. The individual logical elements are built up of a top plate and a bottom plate of uniform ground plan and dimensions, for instance a rectangle, each bottom plate of each logical element being provided with a feeder hole or inlet opening, and each logical element has means for attaching said element on the feeder block, the top plate having holes for the admission of the input and output signals said holes being equipped with inserted tubes projecting above the surface of the top plate, while between the top plate and the bottom plate means are provided for securing further plates of the same plan form and size, which contain chambers and passages as well as movable elements for the individual logical functions, whereby the individual logical elements are attached on the plate of the feeder block means. This block means comprises at least two further, tightly interconnected parts, namely an upper block member and a lower plate. The top block of the feeder block means contains a main feeder opening or supply conduit means communicating with a network of feeder grooves or passages communicating with a series of vertical feeder bores registering with the feeder or inlet openings of the individual logical elements while the entire assembly of the logical elements is mounted on the feeder block means. A tubular means in the form of flexible pipes suitably made of plastic or such like material, fitting over the aforementioned tubes to interconnect the logical elements.

An embodiment of the present invention will now be described by way of example with reference to the accompanying drawings in which:

FIG. 1 shows a logical element;
FIGS. 2a to 2d show the feeder block and the attachment of the logical elements; and
FIG. 3 shows the feeder block with the elements and the connecting network.

FIG. 1 shows the assembly of an individual pneumatic logical element according to the present invention. Between a bottom plate 1 and a top plate 4 further plates are gripped by means of screws 16, which contain elements of the logical gating signals. These individual gating pulses are for instance, logical negation, disjunction, conjunction, the "neither-nor" universal function, trigger circuits, etc., which are themselves not objects of this invention. The bottom plate 1 is in particular equipped with a feeder aperture or inlet opening 2 for the admission of a pressure medium, and has a pair of threaded bores 3 for attaching the element on the feeder block means. Additional threaded bores are provided for the screws 16 which connect the individual plates of the logical element. The top plate 4 of the logical element has upper openings forming admission and discharge passages for the signal network, and their openings are equipped with tubes 5.

FIG. 2a illustrates the embodiment of a feeder block means which consists of two, closely-connected parts, namely an upper block 6 and a lower plate 7, in which a series of aligned holes 13 for the attaching screws 14 of the logical elements are drilled.

FIG. 2b is the overall plan view of the feeder block 17 equipped with its pneumatic, logical elements.

FIG. 2c indicates the plan arrangement of the feeder grooves forming the network of communicating feeder passages 9 and the arrangement of the vertical feeder bores 10. FIG. 2c shows the feeder block means with the bottom plate 7 thereof removed, so as to illustrate how the bottom face of the upper block member 6 appears when looking toward this bottom face. Thus FIG. 2c illustrates the network of grooves forming feeder passages 9, as well as the manner in which the supply conduit means 8 communicates therewith.

FIG. 2d shows in section a part of the feeder block which contains the main feeder aperture forming the supply conduit means which extends horizontally through a portion of the upper block member 6 and communicating with the feeder network of passages 9 so as to provide in this way the inlet 8, opening into the system of feeder grooves 9, which communicate with a series of vertical feeder bores 10 for the individual, logical elements. These vertical feeder bores 10 are enlarged at their upper ends by cylindrical countersinks 11 in which packing or sealing rings 12 are fitted which provide a seal between the vertical feeder bores 10 in the block 6, and the feeder or inlet hole 2, the logical element.

FIG. 3 shows the switching arrangements of the pneumatic, logical elements mounted on the feeder block means 6, 7, this system being connected by means of flexible pipes fitting over the upper tubes and forming therewith a tubular means.

The advantage of this invention consists in the absolute interchangeability of the feeder and signal circuit systems for all kinds of pneumatic, logical switching circuits. Furthermore the easy interchangeability of the individual logical elements, the simplicity of the arrangement from the manufacturing point of view, the high reliability of operation of the circuits, the advantageous flow conditions in the signal circuit network, which represents the optimum solution in regard to the minimal length of the individual connections as well as the annular or ring arrangement of the individual circuits.

What we claim is:

1. A pneumatic logic system, comprising feeder block means having top and bottom faces and being formed between said faces with a network of feeder passages all of which communicate with each other, said feeder block means being formed with a plurality of bores extending from said top face of said feeder block means downwardly to and communicating with said network of feeder passages, supply conduit means operatively connected with said feeder block means and communicating with said network of passages for supplying air under pressure thereto, a plurality of logic elements situated over said feeder block means and connected theerto, said elements respectively having bottom inlet openings respectively aligned with said bores, means situated between said elements and said block means for providing fluid-tight communication between said inlet openings of said elements and said bores, respectively, so that air under pressure supplied through said supply conduit means to said network of feeder passages will flow from the latter through said bores into said inlet openings of said logic elements, respectively, said logic elements having upper openings, and tubular means, composed of a plurality of rigid tubes inserted in the upper openings of said logical elements, and of flexible interchangeable tubes connected with said first mentioned rigid tubes, said tubular means communicating fluid-tightly with said upper openings of said logic elements for providing pneumatic communication therebetween.

2. The combination of claim 1 and wherein said means providing fluid-tight communication between said logic elements and said feeder block means includes a plurality of sealing rings compressed between said logic elements, on the one hand, and said feeder block means, on the other hand, at the locations where said inlet openings of said elements are respectively aligned with said bores.

3. The combination of claim 1 and wherein said feeder block means includes an upper block member and a lower plate fixed thereto, said upper block member having a bottom surface fluid-tightly engaged by said lower plate, and said bottom surface of said upper block member being formed with grooves which constitute said network of feeder passages, said upper block member being formed with said bores extending from said grooves to an upper face of said upper block member which forms said top face of said feeder block means.

4. The combination of claim 3 and wherein said supply conduit means includes a portion of said upper block member which is formed with a bore extending substantially horizontally from one of said grooves to the exterior of said block member.

References Cited

UNITED STATES PATENTS

| | | | |
|---|---|---|---|
| 3,057,551 | 10/1962 | Etter | 137—81.5 |
| 3,076,473 | 2/1963 | Wadey | 137—81.5 X |
| 3,158,164 | 11/1964 | Barton | 137—608 X |
| 3,176,714 | 4/1965 | Smith et al. | 137—608 X |
| 3,226,530 | 12/1965 | Greenblott et al. | 137—81.5 X |
| 3,229,705 | 1/1966 | Notwood | 137—81.5 |
| 3,234,963 | 2/1966 | Lyon | 137—608 |
| 3,258,023 | 6/1966 | Bowles | 137—81.5 |

OTHER REFERENCES

IBM Technical Disclosure Bulletin, "Vacuum Document Transport Apparatus," T. H. Anderson, vol. 6, No. 9, February 1964, pp. 65, 66.

Control Engineering, "How To Use Turbulence Amplifiers For Control Logic," by R. N. Auger, June 1964, pp. 89–93.

Process Control and Automation, "Universal Modular System For Pneumatic Switching Controls," by L. A. Staner vol. 11, No. 7, July 1964, pp. 310–312.

M. CARY NELSON, *Primary Examiner.*

SAMUEL SCOTT, *Examiner.*